United States Patent [19]

Shafer

[11] 4,344,676
[45] Aug. 17, 1982

[54] SINGLE ELEMENT SPHERICAL SURFACED OPTICS INSENSITIVE TO WAVELENGTH AND TEMPERATURE

[75] Inventor: David R. Shafer, Fairfield, Conn.
[73] Assignee: The Perkin-Elmer Corporation, Norwalk, Conn.
[21] Appl. No.: 117,032
[22] Filed: Jan. 31, 1980

Related U.S. Application Data

[63] Continuation-in-part of Ser. No. 82,814, Oct. 9, 1979, Pat. No. 4,331,390.

[51] Int. Cl.³ .............................................. G02B 17/00
[52] U.S. Cl. ..................................................... 350/444
[58] Field of Search ......................................... 350/444

[56] References Cited

U.S. PATENT DOCUMENTS

| | | | |
|---|---|---|---|
| 2,378,301 | 6/1945 | Kaprelian | 350/444 |
| 2,571,657 | 10/1951 | Bennett | 350/444 |
| 2,640,393 | 6/1953 | Wreathall | 350/444 X |
| 3,647,284 | 3/1972 | Elings et al. | 350/444 X |

Primary Examiner—John K. Corbin
Assistant Examiner—Scott J. Sugarman
Attorney, Agent, or Firm—Salvatore A. Giarratana; Edwin T. Grimes; Thomas P. Murphy

[57] ABSTRACT

These thick elements are all corrected for third order spherical aberration and they are also corrected for spherochromatism (i.e. chromatic variation of spherical aberration) or longitudinal color or both. Most are preferably made of materials of low index of refraction less than 1.55, such as BK-7 or fused silica.

Most elements corrected for third order spherical and spherochromatism exhibit longitudinal color, but this poses no problem when they are used with a single wavelength laser. Such systems can be used to focus a laser beam to provide a very fast f number diffraction-limited point source, or used in optical testing, experiments, and the like. The designs are characterized by an extremely low sensitivity of performance to wavelength changes and thus to uniform temperature changes (thermal soaks). A temperature change of several hundred degrees centigrade—from cryogenic temperatures up to near the melting point of the optics, has essentially no effect on the predicted performance. Since the systems have no aspheric surfaces, they are substantially less expensive than fast f number parabolic mirrors, which would also provide point sources. The systems are also less alignment sensitive than parabolas of the same f number.

Several systems have low fifth order spherical aberration which can be fully corrected if divided into two elements.

Other systems useful in interferometric testing with lasers are described. Some employ multiple passes through a single optical element. These may be corrected for third spherical aberration, longitudinal color, and spherochromatism. Such an element with an index of 1.71 is described.

2 Claims, 10 Drawing Figures

SINGLE ELEMENT SPHERICAL SURFACED OPTICS INSENSITIVE TO WAVELENGTH AND TEMPERATURE

RELATED APPLICATIONS

This application is a Continuation-in-part of my earlier application filed Oct. 9, 1979, Ser. No. 082,814, now U.S. Pat. No. 4,331,390 entitled MONOCENTRIC OPTICAL SYSTEMS, which application is incorporated herein by reference.

TECHNICAL FIELD

This invention relates to SINGLE ELEMENT SPHERICAL SURFACED OPTICS INSENSITIVE TO WAVELENGTH AND TEMPERATURE. More particularly it relates to such optics useful as laser (or other monochromatic) beam focusers and divergers.

BACKGROUND ART

H. F. Bennett, U.S. Pat. No. 2,571,657, issued Oct. 16, 1951, entitled CATADIOPTRIC LENS SYSTEMS discloses a number of monocentric lens systems including a system which looks very much like FIG. 1 of this application. In my above-identified application I disclosed that such systems can be corrected for both third order and fifth order spherical aberration while monocentric, provided the index of refraction of the element is $n=1.445$. Such designs have longitudinal color and spherochromatism and can only be used at a single wavelength. Such designs are therefore wavelength sensitive and if the temperature changes the index of refraction will change, destroying the correction which is only good at $n=1.445$.

DISCLOSURE OF THE INVENTION

I have discovered quite by accident that non-monocentric spherical surfaced single element designs can be corrected for third order spherical aberration and may also, in addition, be corrected for one of, spherochromatism or longitudinal color, and in multiple pass designs for both. Laser focusing elements corrected for third order spherical and spherochromatism are very practical since the only change induced by a different wavelength is a change in the focal position, which can easily be compensated for. Similarly, a number of single element divergers are possible wherein third order spherical and longitudinal color are corrected. These designs exhibit spherochromatism but the spherochromatism is not great and they still may be utilized over a wide range of wavelengths. I have also found that certain three-pass design single element optics can be corrected for third order spherical aberration, spherochromatism, and longitudinal color.

A laser beam focuser according to my invention split into two elements mounted in material of the same thermal characteristics can be corrected for both third order and fifth order spherical aberration and spherochromatism.

All of the designs disclosed may be operated at many different wavelengths and at many different ambient temperatures without destroying their corrections.

All of the designs are "thick"; that is the shortest distance through the transmissive element along the optical axis is at least one-fourth of the shortest radius of any optical surface. Furthermore, all single or double pass embodiments may have an index of refraction of less than 1.55.

OBJECTS OF THE INVENTION

It is therefore an object of the invention to provide single element optical systems insensitive to wavelength and temperature.

Another object of the invention is to provide such optical systems employing only spherical surfaces.

A further object of the invention is to provide optical systems of the above character suitable for use as laser focusers.

Still another object of the invention is to provide optical elements of the above character suitable for use as laser beam divergers.

Yet still another object of the invention is to provide optical elements of the above character with large fields of view, compared to parabolic mirrors of the same F#.

Another object of the invention is to provide such optical elements that provide small wavefront deformation.

Yet another object of the invention is to provide slightly improved performance in such optical systems by splitting them into two elements.

Other objects of the invention will in part be obvious and will in part appear hereinafter. The invention accordingly comprises the features of constructions, elements and arrangements of parts and articles of manufacture possessing the features, properties, and relations of elements, all of which will be exemplified in the articles and constructions hereinafter described. The scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

The same reference characters refer to the same elements throughout the several views of the drawings.

BEST MODE FOR CARRYING OUT THE INVENTION

Figure 1:
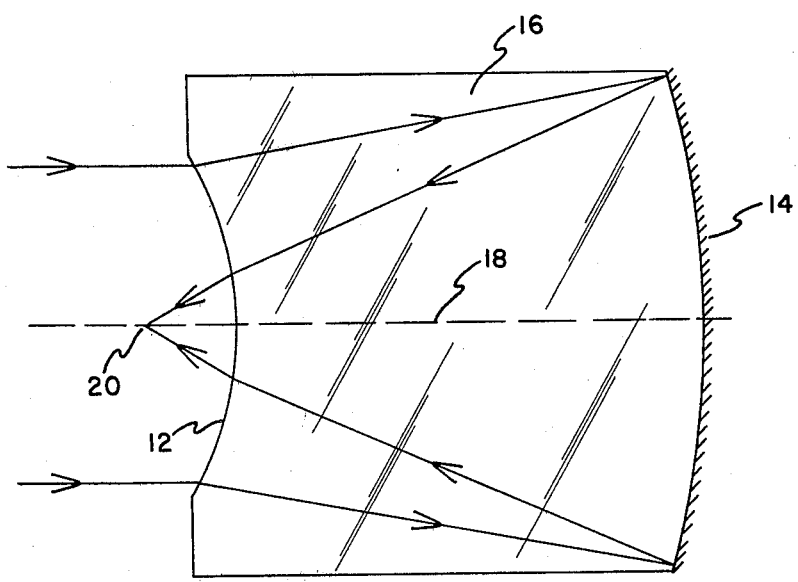
FIG. 1 is a diagram of a beam focuser according to the invention.

There are many uses for lasers which require focusing the light to provide a point source. Optical testing and experiments with writing or reading micron size details for optical memories, and the like often need fast f number diffraction-limited laser focusing devices. Microscope objectives can be used but have the objectionable features of having very short working distances for speeds of f/1.0 or faster, and many optical elements which give a multitude of ghost images, spurious laser fringes and scattering. Fast f number parabolic mirrors can be used to focus a laser beam to a point, but they are difficult and expensive to make in small sizes, and have a very small field of view.

At the 1979 annual Optical Society meeting in Rochester, N.Y. I described a single element monocentric catadioptric system which looked very much like FIG. 1. It can be corrected for both third order and fifth order spherical aberration while monocentric, provided the index of refraction of the element is $n=1.445$. It gives very good performance at fast f number speeds with no field aberrations except Petzval curvature. It does have longitudinal color and spherochromatism, so the design in only intended for monochromatic applications, unless the element is achromatized by splitting it into two different glasses.

When the element does not have an index of $n=1.445$ the third and fifth order spherical aberration cannot be corrected unless the monocentric condition is dropped. This in turn introduces field aberrations. While studying such single element designs of various materials that were not monocentric but were corrected for third and fifth order spherical aberration, I noticed that spherochromatism was almost corrected. By contrast, the monocentric designs had a considerable amount of spherochromatism.

So I had a design that was not monocentric, that had great performance. Then I just, out of curiousity, looked to see what the temperature effect would be because I know that some of these things are very sensitive, and I found that over some enormous temperature range the performance did not change. Then I forgot about it. Recently I went back and looked at the Bennett design, U.S. Pat. No. 2,571,657, also a single piece, but monocentric, and was for some reason trying to duplicate my earlier analysis of temperature. I was very surprised that the Bennett system is not insensitive to temperature, it is not very sensitive, but exhibits nothing like the enormous insensitivity of my earlier design. I started to think about it and I realized there is a significant difference, a great difference in temperature sensitivity between the monocentric design and one that is not. When I looked at it on a computer and studied it I realized that the Bennett design is not corrected for spherochromatism. It means that with either wavelength or temperature, either one, the spherical aberration changes in the Bennett system. So then I looked at the design which is not monocentric and I found that the spherochromatism is almost corrected in the non-monocentric design. What I had done by departing from monocentricity is to exactly correct third and fifth order spherical aberration. Any by exactly correcting third and fifth order spherical aberration the spherochromatism almost cancelled, but not quite. So then I said to myself if you wanted to you could obviously make it cancel and correct the spherochromatism by dropping one of the other things. In this case what I did was I dropped fifth order spherical aberration and did not try to correct that anymore. I tried to correct the third order spherical aberration and spherochromatism. When I did that, I got something that was completely insensitive to wavelength and temperature but is not quite as good in performance as when you corrected fifth order spherical, but of the three things, third order spherical, fifth order spherical, and spherochromatism, out of those three you can only correct two out of the three with the number of variables at your disposal, with a single piece and the double pass I had in mind.

FIG. 1 shows a design which is not monocentric and which is corrected for third spherical aberration and spherochromatism. The optimized f/1.0 design comprises spherical surface 12 of radius -1.0569, and mirrored spherical surface 14 of radius -2.7174 on element 16 having a thickness along the optical axis 18 of 1.4867. Fifth order spherical aberration is very small, but it does not seem possible to correct it and spherochromatism at the same time; either one can be controlled, but not both at once. Longitudinal color is still present so the focus shifts with wavelength. The performance, however, does not change with wavelength.

Figure 2:
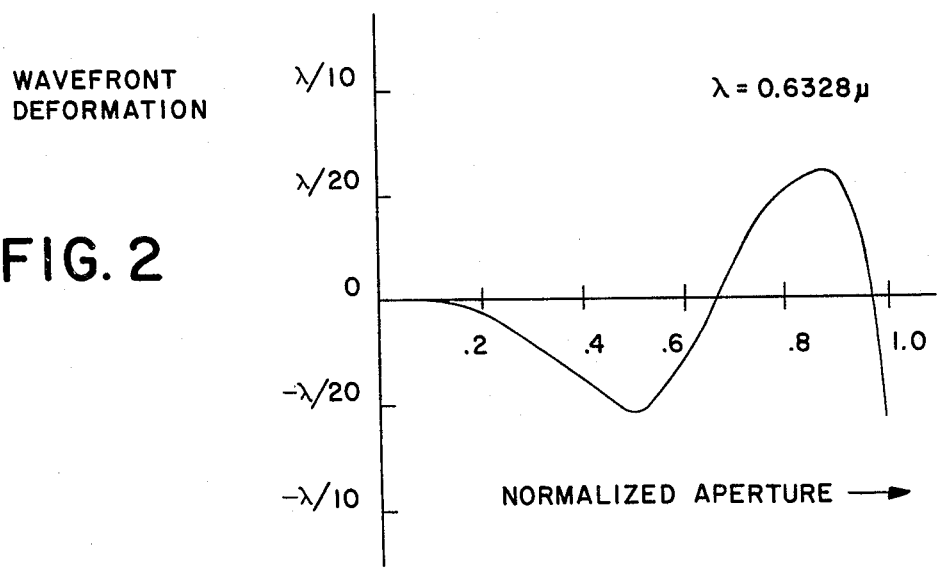
FIG. 2 is a diagram of the wavefront deformation produced by the beam focuser illustrated in FIG. 1.

FIG. 2 shows the wavefront deformation for the f/1.0 design as shown in FIG. 1 that has a 2.5 cm. focal length—a nice convenient size to consider for use as a small laser beam focuser. The wavefront quality is $\pm\lambda/20$ at 0.6328 microns. The design has been optimized so that third and fifth order spherical aberration and defocus have been balanced to give the optimum performance while spherochromatism (i.e. chromatic variation of third order spherical aberration) has been made zero.

The design uses Schott BK-7 glass, which has an index of refraction which varies from about $n=1.49$ to $n=1.55$ over its useful transmission window range in the spectrum (from 0.3 to 2.3 microns). Over this enormous spectral range the wavefront quality changes by less than $\lambda/100$, when referred to $\lambda=0.6328$ microns. It is so insensitive that it doesn't really matter what glass is used to make the FIG. 1 system: If you switch from a light crown to a dense flint and keep all the radii unchanged, the performance will not be appreciably affected.

The FIG. 1 design, therefore, makes a high performance, fast f number laser beam focuser which can be used with any laser from the ultra violet up to 1.06 microns and beyond. The position of the focus 20 will change slightly as different wavelength lasers are used, for the design is not corrected for longitudinal color, but the quality of the wavefront will be unaffected. Furthermore, the effect of a uniform temperature change on the single element is almost vanishingly small. Since it is a single element design, thermal expansion simply changes the scale of the element slightly and has no effect on performance. On the other hand, the index change with temperature over a range of hundreds of degrees Centigrade is much less than that due the spectral range already examined. In fact, it would take a change from near absolute zero to near the melting point of BK-7 to give as much performance change as the 0.3–2.3 micron spectral range does. This assumes, of course, no thermal gradients or material inhomogeneities.

The usable field of view is limited by coma and is rather small. It is however, six times larger than the diffraction—limited field of view of a parabolic mirror with the same focal length and f number.

Figure 3:
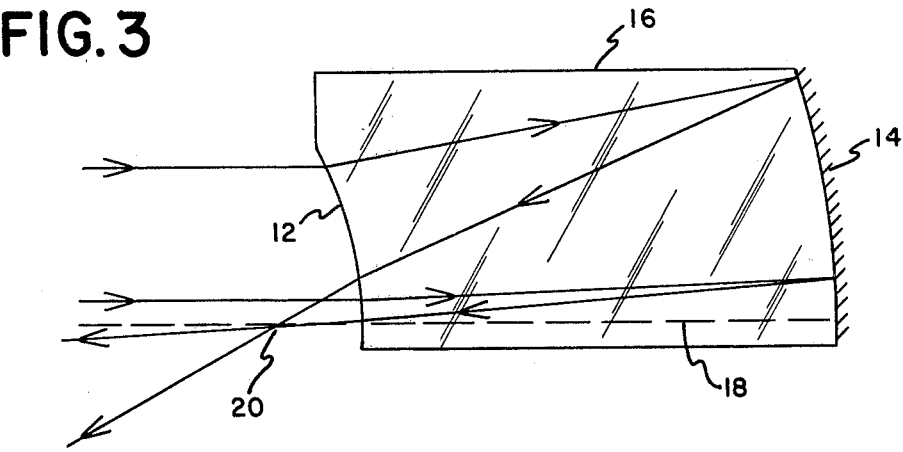
FIG. 3 is a diagram of a beam focuser comprising one-half the optical element illustrated in FIG. 1.

FIG. 3 shows how the system of FIG. 1 can be cut in half so as to provide a more accessible focus location 20. This, of course, also gives a slower f number at the same time. Finite conjugate design versions are also possible.

Figure 4:
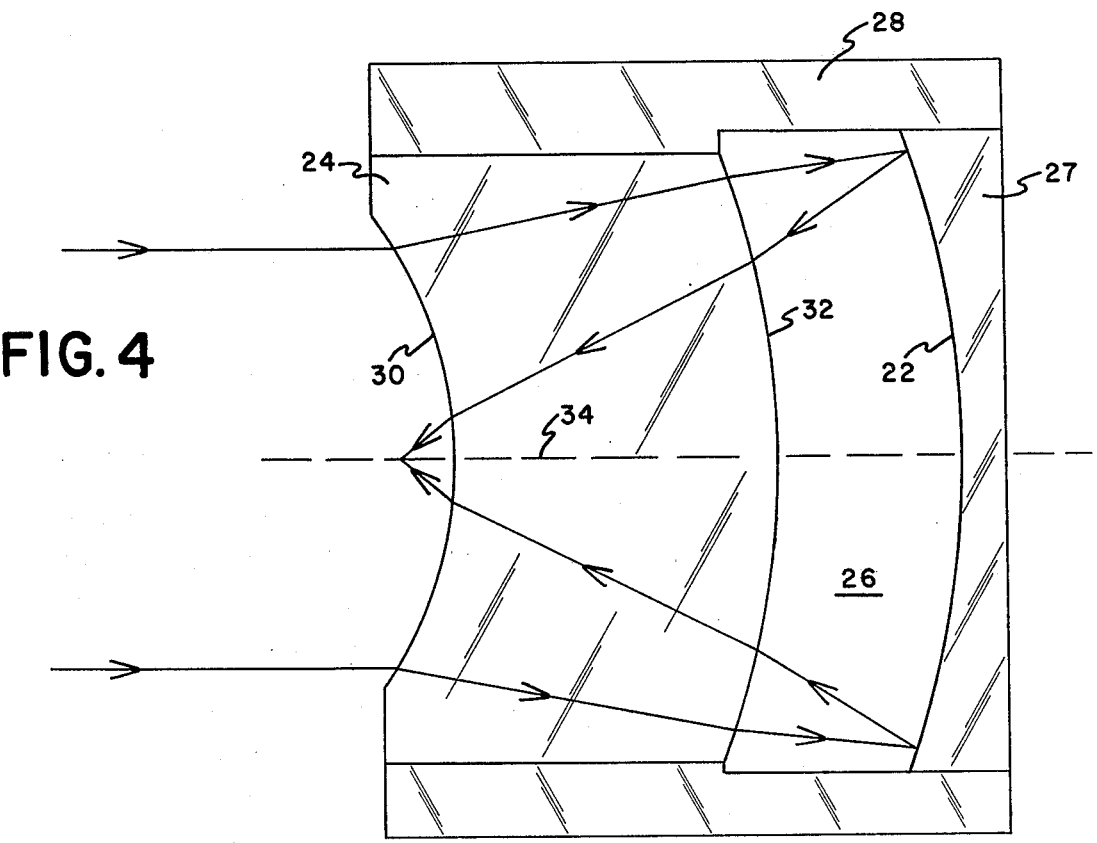
FIG. 4 is a diagram of a two-element beam focuser similar to that shown in FIG. 1.

Although the design of FIG. 1 has very low fifth order spherical aberration, by splitting the element into two pieces as shown in FIG. 4, third and fifth order spherical aberration and spherochromatism can all be corrected. As shown in FIG. 4 mirror surface 22 has been separated from element 24 by air gap 26. Preferably mirror mount 27, element 24 and ring holder 28 holding them together are all made of the same material, (e.g. BK7 or fused silica). By this means temperature insensitivity is maintained.

A design not optimized for higher orders employs a spherical surface 30 of radius -6.000, a spherical surface 32 of radius -13,729, mirror 22 is also spherical and conveniently of the same radius -13.729, element 24 has a thickness along the optical axis 34 of 5.702 and the thickness of the air gap 26 along the axis 34 is 2.553.

For many situations in optical testing, it is not necessary to have an accessible point source, a virtual point source will serve just as well. For these cases there are several interesting single element designs that will now be discussed. The goal is to always arrange it so that the designs are insensitive to uniform temperature or wavelength changes.

Figure 5:
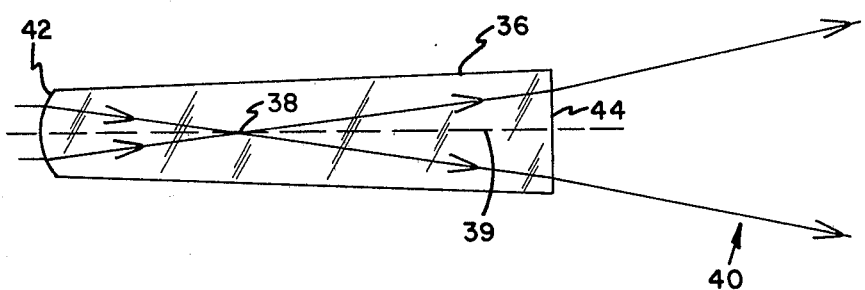
FIG. 5 is an achromatic beam diverger having no third order spherical aberration.

FIG. 5 shows the simplest of these systems. It is a very thick lens 36 with a focus 38 on optical axis 39 inside the element. The diverging output 40 provides a virtual point source for use in optical testing. The element employing the positive surface 42 and nearly plano surface 44 has a speed of f/2.5. Both third order spherical aberration and longitudinal color can be corrected in such a design, but spherochromatism cannot be controlled. A uniform temperature change or a wavelength change will not affect the position of the virtual point source, but the wavefront quality will change due to spherochromatism. This design also has high fifth order spherical aberration.

Figure 6:
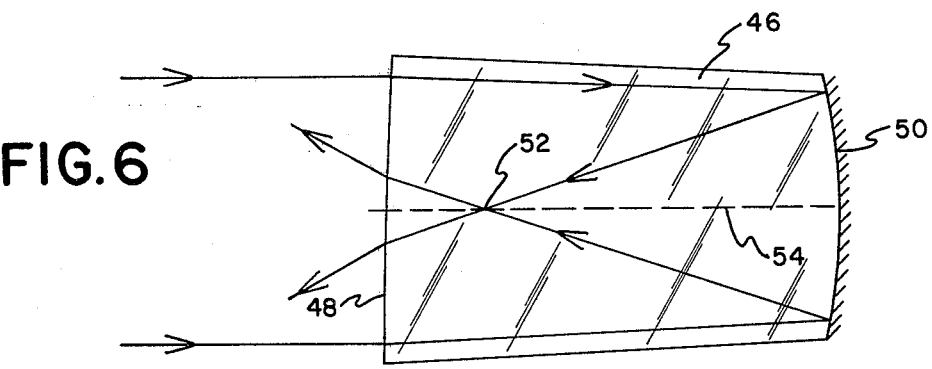
FIG. 6 is a diagram of an F/1 achromatic beam diverger.
Figure 7:
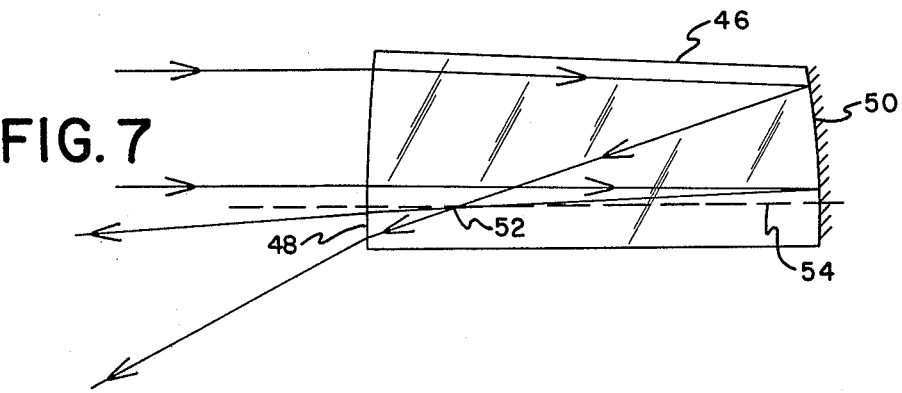
FIG. 7 is a single element achromatic beam diverger comprising one-half the element illustrated in FIG. 6.

FIG. 6 shows a system which has excellent performance at fast speeds. It is also achromatic and is also not corrected for spherochromatism. FIG. 7 shows how the system can be cut in half so that the output is displaced away from the input beam. This also slows down the f number speed, of course.

An f/1.0 achromatic beam diverger 46 according to the design shown in FIG. 6 employing Schott BK-7 glass for a 2.5 cm. focal length employs a slightly positively curved spherical entrance surface 48 and a shorter radius mirrored spherical surface 50. The focus 52 is interiorly located at the optical axis 54. This design is corrected for third order spherical aberration and longitudinal color deformation and produces a wavefront deformation of $\pm\lambda/8$ at 0.6328 microns. The FIG. 7 design is the same as the FIG. 6, but has been cut in half to avoid obscuration. The f number is f/2.5.

Figure 8:
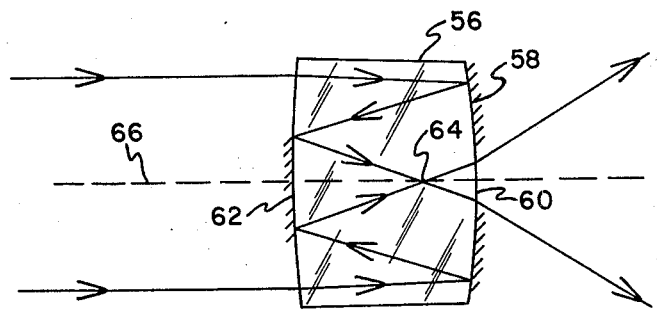
FIG. 8 is an illustration of a compact three-pass beam diverger.

A different kind of system is shown in FIG. 8, where the output is heading in the same direction as the input beam, as in FIG. 5.

Monochromatic performance is very good and it is a more compact design than the other systems. This f/1.0 design produces a wavefront deviation of $\lambda/8$ at 0.6328 microns for a 2.5 cm. focal length.

Figure 9:
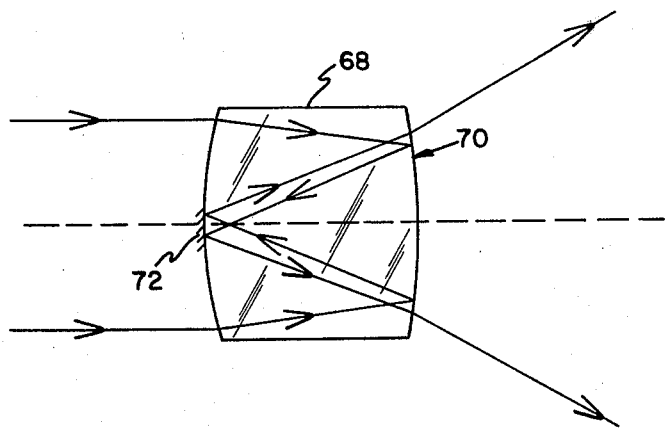
FIG. 9 is a diagram of a three-pass beam diverger which may be corrected for third order spherical aberration.
Figure 10:
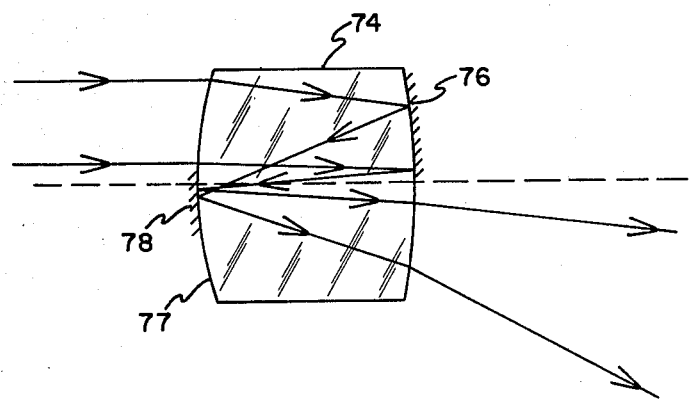
FIG. 10 is a similar three-pass design with no obscuration.

In the design of FIG. 8 the element 56 has all of the spherical rear surface 58 mirrored except the central portion 60 thereof, and has a central portion of its front spherical surface mirrored in the central portion 62 thereof. Thus the light enters from the left, is reflected at the surface 58, reflected again at the surface 62 and exits through the opening 60 in the surface 58, having been focused at focus 64 on the optical axis 66 within the element 56. Element 56 is corrected for third order spherical aberration and longitudinal color, but is not corrected for spherochromatism and has a sizable amount of obscuration. It turns out that there is another solution of this type, shown in FIG. 9, which is also achromatic and corrected for third order spherical aberration. It is not very useful in the form shown, but FIG. 10 shows how the input beam can be displaced to one side so that the output comes out more conveniently. The element 68 of FIG. 9 employs a partially reflecting rear spherical surface 70 and a central mirrored front spherical surface 72. What is really nice about this design is that spherochromatism can be corrected. It is exactly corrected, along with longitudinal color and third order spherical aberration, if the single element has an index of refraction of n=1.71 and the thickness and radii are chosen correctly. None of the other designs can be simultaneously corrected for all three aberrations, regardless of the index of refraction. Schott glass SF-1 is about the right index for the FIGS. 9 and 10 systems, and gives a design which has both constant performance and a constant virtual focus position over an enormous temperature and wavelength range. It is really quite surprising that so much can be done with just a single element and no aspheric surfaces. In FIG. 10 element 74 has its rear spherical surface 76 mirrored at the top and its front spherical surface 77 has a mirrored portion 78 offset and below the mirrored portion 76.

It will thus be seen that the objects set forth above, among those made apparent from the preceding description, are efficiently attained and, since certain changes may be made in the above described articles and constructions without departing from the scope of the invention, it is intended that all matter contained in the above description or shown in the accompanying drawings shall be interpreted as illustrative and not in a limiting sense.

It should also be understood that "spherical" when used herein includes flat surfaces, i.e. those of radius zero.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. An optical system comprising,
   (A) a single transparent element;
   (B) first and second spherical surfaces on said element, said first surface being negatively curved and said second surface being a mirror, each of said surfaces on said element having
       (a) a common axis, and
       (b) different centers of curvature,
   (C) said element being chosen from the group consisting of fused silica and BK-7 and the radius of said first surface is -1.0569, the radius of said second surface is -2.7174, and the thickness of said element along the optical axis is 1.4867,
   (D) the radii of said surfaces and the index of refraction of said element being chosen to correct without further optical surfaces for third order spherical aberration and spherochromatism.

2. The optical system of claim 1 wherein an input beam is located off the optical axis to provide a focus spaced away from the input beam.

* * * * *

UNITED STATES PATENT AND TRADEMARK OFFICE
CERTIFICATE OF CORRECTION

PATENT NO. : 4,344,676

DATED : August 17, 1982

INVENTOR(S) : David R. Shafer

It is certified that error appears in the above-identified patent and that said Letters Patent are hereby corrected as shown below:

Column 3, line 19, change "in" to --is--.

Signed and Sealed this

Twenty-sixth Day of April 1983

[SEAL]

Attest:

GERALD J. MOSSINGHOFF

Attesting Officer     Commissioner of Patents and Trademarks